US007046386B2

(12) United States Patent
Davenport et al.

(10) Patent No.: US 7,046,386 B2
(45) Date of Patent: May 16, 2006

(54) BANDWIDTH BOOSTER FOR AGING PRINTER ASICS

(75) Inventors: Perry E. Davenport, Longmont, CO (US); Richard S. Lucky, Louisville, CO (US); Kin H. Szeto, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 09/993,752

(22) Filed: Nov. 14, 2001

(65) Prior Publication Data

US 2003/0090703 A1  May 15, 2003

(51) Int. Cl.
*G06K 1/00* (2006.01)
(52) U.S. Cl. ............... 358/1.15; 358/1.16; 358/444; 347/15; 347/225; 364/518; 395/115
(58) Field of Classification Search ............. 358/1.15, 358/1.16, 444; 347/15, 225; 364/518; 395/115
See application file for complete search history.

(56) References Cited

U.S. PATENT DOCUMENTS

| 4,899,291 A | * | 2/1990 | Tsukada et al. ............... 358/1.6 |
| 5,676,475 A | | 10/1997 | Dull ............................. 400/174 |
| 5,704,022 A | * | 12/1997 | Ethington et al. .......... 358/1.16 |
| 5,796,930 A | | 8/1998 | Gauthier et al. ............ 358/1.17 |
| 5,828,814 A | | 10/1998 | Cyman et al. ................ 358/1.2 |
| 6,145,946 A | | 11/2000 | Gauthier et al. ................ 347/5 |
| 6,824,239 B1 | * | 11/2004 | Hanabusa et al. ............. 347/15 |
| 6,856,338 B1 | * | 2/2005 | Takahashi et al. ........... 347/225 |

* cited by examiner

*Primary Examiner*—Twyler Lamb
*Assistant Examiner*—Robert Kang
(74) *Attorney, Agent, or Firm*—Jose Gutman; Fleit, Kain, Gibbons, Gutman, Bongini & Bianco P.L.

(57) ABSTRACT

A method triggers a printer (106) to receive a signal (300) from a print engine (202) indicating the initiation of the transmission of print data; transmits a shorter signal (302) to a printer ASIC (204), in response to receiving a first signal; receives a first line of data to be printed from the printer ASIC (204); receives a second signal from the print engine (202); transmits a second shorter signal to the printer ASIC (204), in response to receiving a signal; receives a second line of data to be printed from the printer ASIC (204); and transmits the first line of data to the print engine (202). This allows a slower printer ASIC (204) to be used with a faster print engine (202).

3 Claims, 5 Drawing Sheets

BANDWIDTH BOOSTER FOR AGING PRINTER ASICS

BACKGROUND OF THE INVENTION

1. Field of the Invention

This invention generally relates to the field of printer systems, and more particularly relates to a circuit for increasing the bandwidth for aging printer print engines and related ASICs.

2. Description of Related Art

In today's fast paced technology markets, products are rapidly being developed to be faster and more powerful. The design of printers is no exception. Print engines are constantly being updated to allow for more pages printed per minute and better quality printing. In these printers, often an Application Specific Integrated Circuit (ASIC) drives the print engine. When a new, faster print engine is developed, usually a new version of the ASIC must also be created as the current generation of printer ASICs may not have enough bandwidth to drive the faster print engine at the rated speed. Sometimes the bandwidth requirement for the faster print engine is just over the current ASIC's limit, thus requiring a new printer ASIC. The development of ASICs requires the dedication of much time, money, and resources.

Therefore a need exists to overcome the problems with the prior art as discussed above, and particularly for a method of increasing the bandwidth of aging printer engines and related ASICs.

SUMMARY OF THE INVENTION

According to a preferred embodiment of the present invention, a method triggers a printer to receive a first signal from a print engine, indicating the initiation of the transmission of print data; transmits a shorter signal to a printer ASIC, in response to receiving a signal; receives a line of data to be printed from the printer ASIC; receives a second signal from the print engine; transmits a second shorter signal to the printer ASIC, in response to receiving a signal; receives a second line of data to be printed from the printer ASIC; and transmits the first line of data to the print engine. This allows a slower printer ASIC to be used with a faster print engine.

DESCRIPTION OF THE PREFFERRED EMBODIMENTS

The present invention, according to a preferred embodiment, overcomes problems with the prior art by placing a bandwidth booster between the printer ASIC and the print engine. Since data to the printhead 206 does not run from Beam Detect (BD) to BD, there is some dead time at the start and the end of each scan line. A printer ASIC normally would not be allowed to transfer data during those dead times due to timing constraints from the print engine. The bandwidth booster enables the ASIC to transfer data during those dead times and thus effectively increases the bandwidth of the ASIC. This improves the bandwidth limitation and extends the life of the current ASICs.

Figure 1:
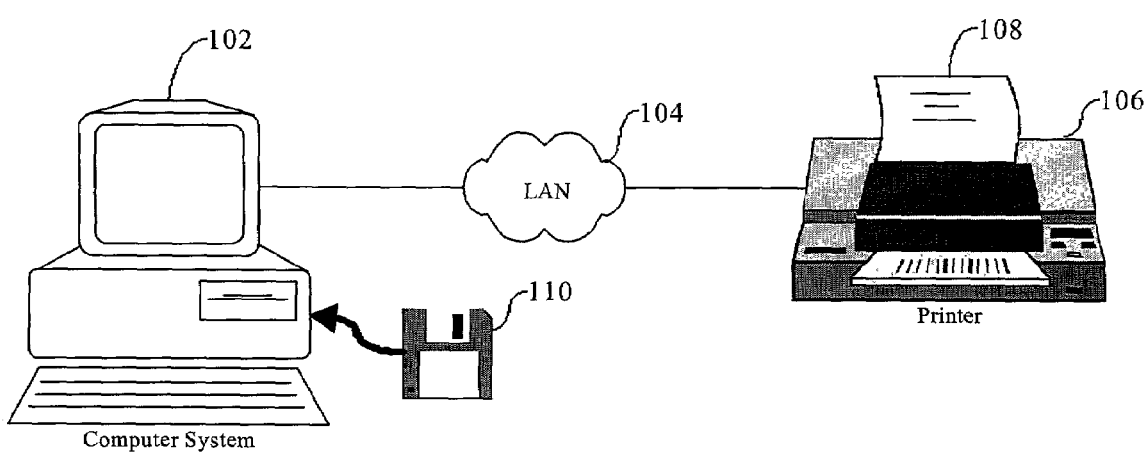
FIG. 1 is a block diagram illustrating a printing system in accordance with a preferred embodiment of the present invention.

FIG. 1 illustrates an exemplary printer system according to a preferred embodiment of the present invention. The printer system 100 includes a printer 106 communicatively coupled to a computer system 102 via a local area network interface 104. The local area network interface 104 may be a wired communication link or a wireless communication link. The printer 106 may also be communicatively coupled with the world-wide-web, via a wide area network interface (not shown) via a wired, wireless, or combination of wired and wireless local area network communication links 104. Alternatively, the printer 106 may also be communicatively coupled locally to the computer system 102.

Each computer system 102 may include, inter alia, one or more computers and at least a computer readable medium 110. The computers preferably include means for reading and/or writing to the computer readable medium 110. The computer readable medium 110 allows a computer system to read data, instructions, messages or message packets, and other computer readable information from the computer readable medium 110. The computer readable medium 110, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium 110 may comprise computer readable information in a transitory state medium such as a network link and/or a network interface, including a wired network or a wireless network, that allow a computer to read such computer readable information.

Figure 2:
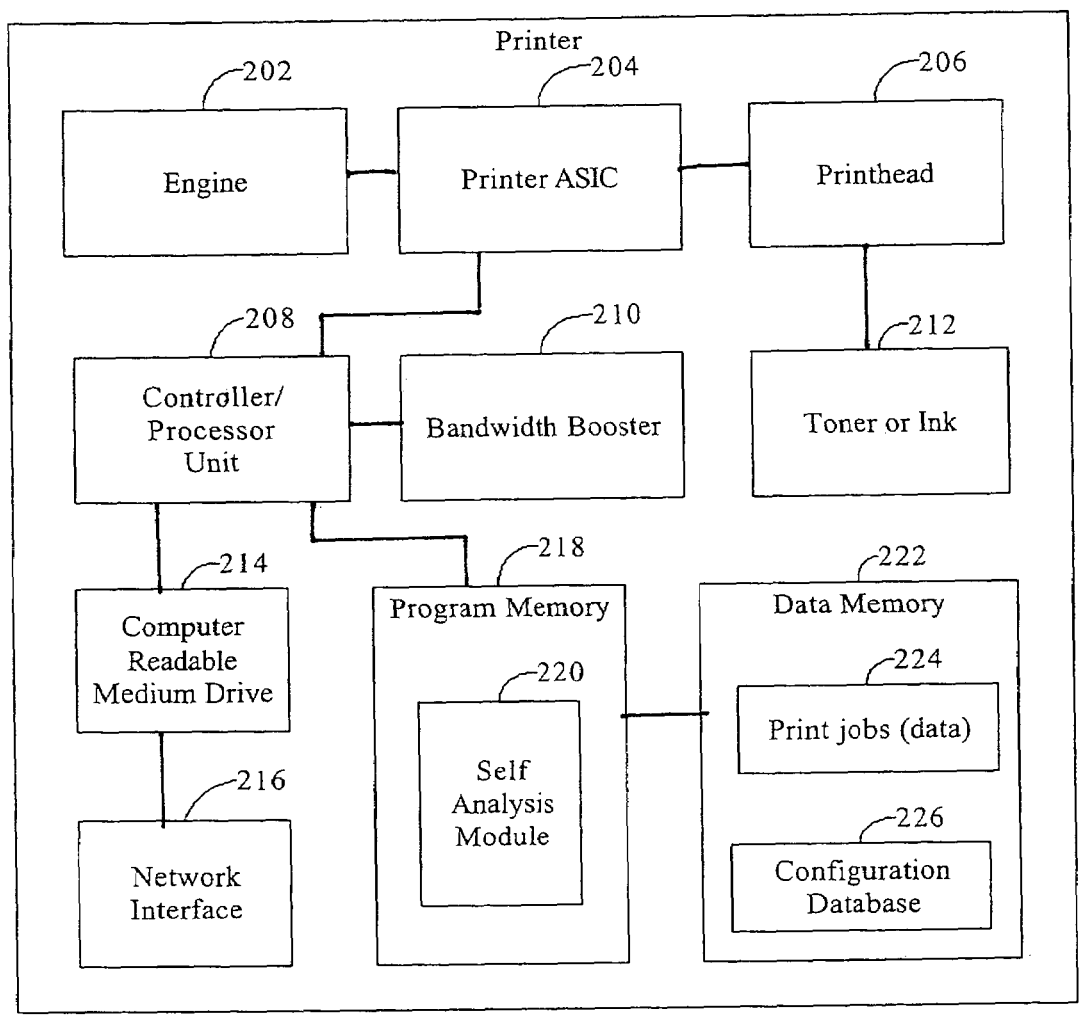
FIG. 2 is a more detailed block diagram showing a printer in the system of FIG. 1, according to a preferred embodiment of the present invention.

The printer 106, according to the present example, includes a controller/processor unit 208 (shown in FIG. 2), which processes instructions, performs calculations, and manages the flow of information through the printer 106. Additionally, the controller/processor 208 is communicatively coupled with program memory 218 which may contain a self-analysis module 220. The controller/processor unit 208 manages resources, such as the data stored in data memory 222, the scheduling of tasks, the operation of a printer engine 202, a bandwidth booster 210 (as will be discussed in more detail below) and a printer ASIC 204. The controller/processor unit 208 may also manage a communication network interface 216 for communicating with the network link 104, and a computer-readable medium drive 214. Additionally, the controller/processor unit 208 also manages many other basic tasks of the printer 106 in a manner well known to those of ordinary skill in the art.

In a preferred embodiment, the controller/processor unit 208 is communicatively coupled to the bandwidth booster 210 and to the printer ASIC 204. The bandwidth booster 210 is communicatively coupled to the print engine 202 and to the printer ASIC 204. The print engine 202 may include a fusing or drying system (not shown) and a printhead 206. The printhead 206 is used to apply toner or ink 212 to paper 108. Data memory 222 is communicatively coupled to the controller/processor unit 208 and may contain a queue of print jobs 224, and a configuration database 226.

Figure 3:
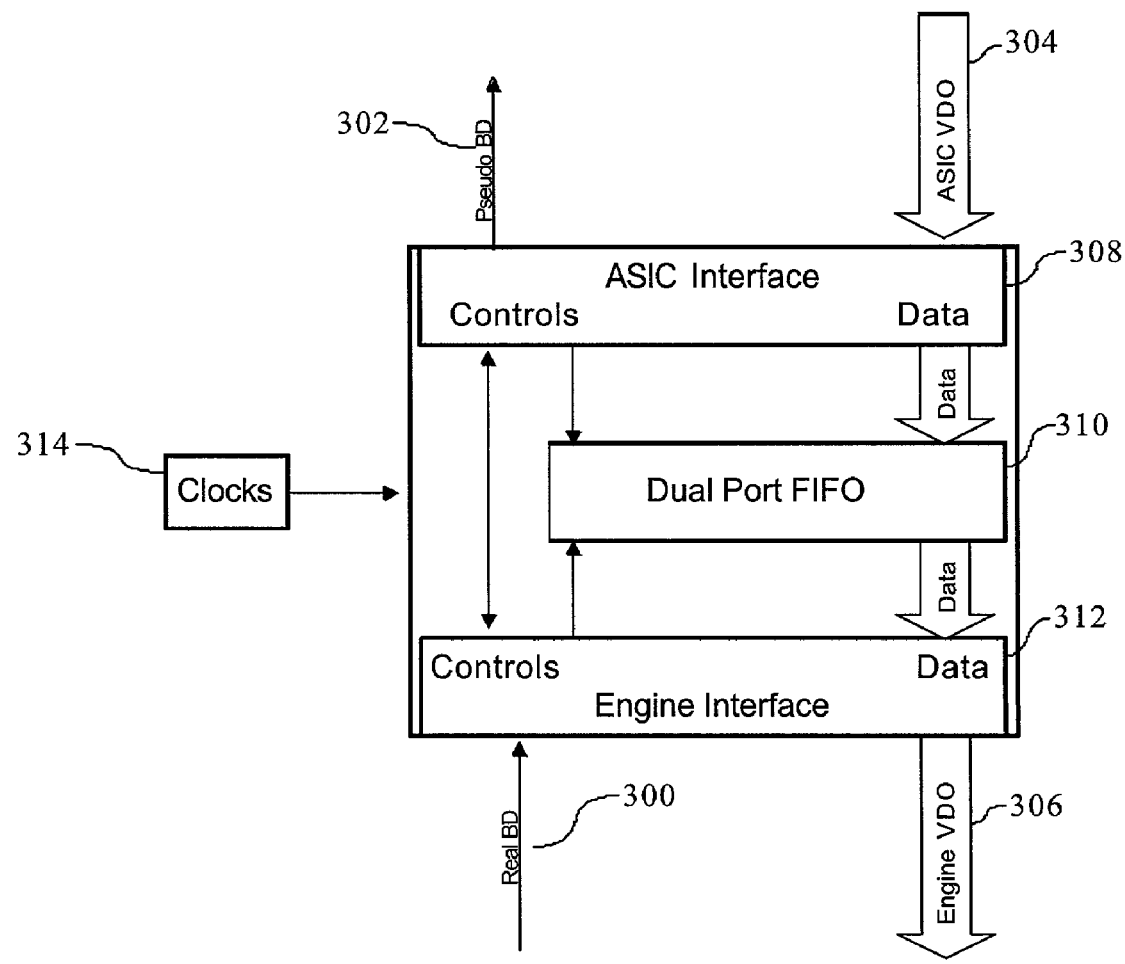
FIG. 3 is a more detailed block diagram showing a bandwidth booster in the printer of the system of FIG. 1, according to a preferred embodiment of the present invention.

FIG. 3 illustrates an exemplary bandwidth booster 210 of the printer 106 in the system of FIG.1, according to a preferred embodiment of the present invention.

An engine interface 312 is communicatively coupled to the printer engine 202 and a dual port FIFO (First In First Out) device 310. The engine interface receives a real Beam Direct (BD) 300 signal from the printer engine 202 (shown in FIG. 2) and transmits Engine Video Data Out (VDO) 306, received from the FIFO 310, to the printer engine 202 to be printed. An ASIC interface 308 is communicatively coupled to the printer ASIC 204 (shown in FIG. 2) and also to the FIFO 310. The ASIC interface 308 transmits a pseudo BD signal 302 to the printer ASIC 204 in response to the engine interface receiving a longer real BD signal 300. The ASIC interface 308 receives ASIC VDO data 304 from the printer ASIC 204 and transmits this data to the FIFO 310. An external clock 314 is communicatively coupled to the bandwidth booster 210 and controls the timing sequence.

Figure 4:
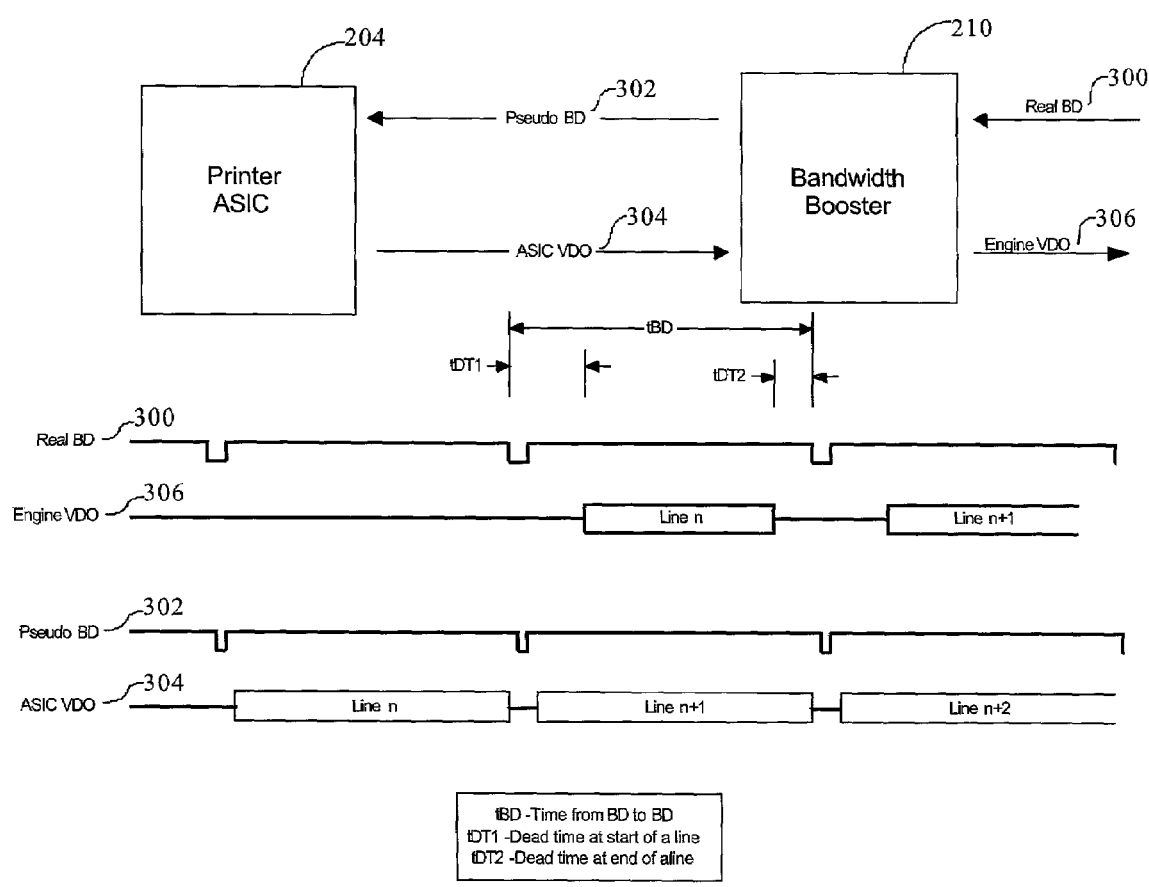
FIG. 4 is an exemplary timing diagram illustrating the timing sequence of a bandwidth booster, a printer ASIC, and a print engine.

FIG. 4 is an exemplary timing diagram illustrating the timing sequence of a bandwidth booster 210, a printer ASIC 204, and a print engine 202. Because data to the printhead 206 does not run from Beam Detect (BD) to BD, there is some dead time at the start and the end of each scan line. A printer ASIC 204 normally would not be allowed to transfer data during those dead times due to timing constraints from the print engine 202. The bandwidth booster 210 enables the printer ASIC 204 to transfer data during those dead times and thus effectively increases the bandwidth of the printer ASIC 204. This is a significant advantage of the present invention that is not available in any known prior art printer system.

In a preferred embodiment, a bandwidth booster 210 is placed between the printer ASIC 204 and the print engine 202. The function of the bandwidth booster 210 is to buffer the print data (shown in FIG. 4 as ASIC VDO 304) and generate a pseudo BD 302 to the printer ASIC 204 for every real BD 300 from the print engine 202. The time between each pseudo BD 302 will be same as the real BD 300. Unlike a real print engine 202, the bandwidth booster 210 can place much less dead time on the pseudo BD 302, thus the same amount of data can be transferred over a longer period of time and, effectively, increases the bandwidth of the printer ASIC 204. The bandwidth booster 210 then transfers the buffered data (shown in FIG. 4 as Engine VDO 306) to the print engine 202 at a higher speed. This allows a slower printer ASIC 204 to be used with a faster print engine 202.

For example a fast print engine 202 requires the following bandwidth:

$$\text{Data}/(t_{BD}-t_{DT1}-t_{DT2})=x\text{Mhz}.$$

The xMhz is over the printer ASIC's 204 limit without the bandwidth booster 210. With the bandwidth booster 210, the tDT1 and tDT2 can be ignored:

$$\text{Data}/(t_{BD}-t_{DT3}-t_{DT4})=y\text{Mhz, where yMhz is less than xMhz.}$$

Depending on the speed of the print engine 202, the bandwidth difference between xMhz and yMhz may make the difference between advantatzeously using a current ASIC 204 or disadvantageously designing a new ASIC.

Figure 5:
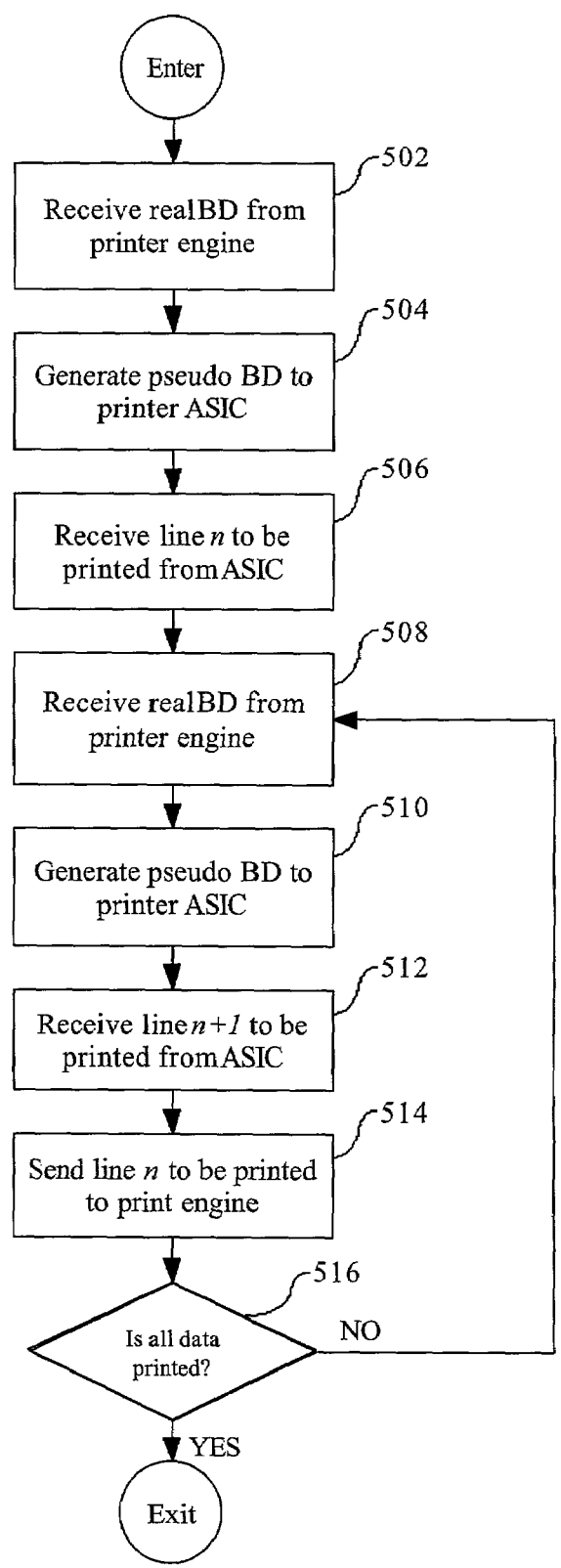
FIG. 5 is an operational flow diagram illustrating an exemplary operational sequence for the system of FIG. 1, according to a preferred embodiment of the present invention.

FIG. 5 is an operational flow diagram illustrating an exemplary operational sequence for the system of FIG. 1. The system enters the sequence at step 502, wherein the engine interface 312 receives a real BD signal 300 from the printer engine 202. At step 504, the ASIC interface 308 generates a shorter pseudo BD signal 302 and transmits the pseudo BD 302 to the printer ASIC 204. In response to receiving the pseudo BD 302, at step 506, the printer ASIC 204 sends a first line n of data to the ASIC interface 308. The data is stored in a dual port FIFO 310. The engine interface 312 then receives the next real BD 300 from the print engine 202, at step 508. Again, at step 510, the ASIC interface 308 sends a pseudo BD 302 to the printer ASIC 204 and the printer ASIC 204, at step 512, begins sending the next line of data (n+1) to the ASIC interface 308. At step 514, the buffered line n data stored in the FIFO 310 is sent to the engine interface 312 and then to the printer engine 202 to be printed. The process is repeated, at step 516, until all lines of data in a print job 224 have been printed.

The present invention can be realized in hardware, software, or a combination of hardware and software. Any kind of printer system—or other apparatus adapted for carrying out the methods described herein—is suited. A typical combination of hardware and software could be a general purpose printer system with a computer program that, when being loaded and executed, controls the printer system such that it carries out the methods described herein.

The present invention can also be embedded in a computer program product, which comprises all the features enabling the implementation of the methods described herein, and which—when loaded in a printer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

The invention claimed is:

1. A method in a bandwidth booster of a printer comprising the steps of:

receiving a first signal having a first duration from a print engine indicating initiation of transmission of print data;

transmitting a shorter signal having a duration shorter than the first duration to a printer ASIC, in response to receiving the signal, the printer ASIC having a bandwidth;

receiving from the printer ASIC a first line of data for printing;

receiving a second signal having a second duration from the print engine;

transmitting a second shorter signal to the printer ASIC, in response to receiving the signal, the second shorter signal having a duration shorter than the second duration;

receiving from the printer ASIC a second line of data for printing; and transmitting the first line of data to the print engine, thereby effectively increasing the bandwidth of the printer ASIC.

2. A computer readable medium including computer instructions for driving a printer, the computer instructions comprising instructions for:

receiving by a bandwidth booster a first BD signal from a print engine indicating initiation of transmission of print data;

transmitting a pseudo BD signal to the printer ASIC, in response to receiving the signal;

receiving by the bandwidth booster a first line of data to be printed from the printer ASIC;

receiving by the bandwidth booster a second BD signal from the print engine;

transmitting a second pseudo BD signal to the printer ASIC, in response to receiving the signal;

receiving by the bandwidth booster a second line of data to be printed from the printer ASIC; and transmitting the first line of data to the print engine.

3. A method in a bandwidth booster of a printer comprising the steps of:

receiving a BD signal having a first duration from a print engine indicating initiation of transmission of print data;

transmitting a pseudo BD signal having a duration shorter than the first duration to the printer ASIC, in response to receiving a signal, the printer ASIC having a bandwidth;

receiving from the printer ASIC a first line of data for printing;

receiving a second BD signal having a second duration from the print engine;

transmitting a second pseudo BD signal to the printer ASIC, in response to receiving the signal, the second pseudo BD signal having a duration shorter than the second duration;

receiving from the printer ASIC a second line of data for printing; and transmitting the first line of data to the print engine, thereby effectively increasing the bandwidth of the printer ASIC.

* * * * *